Figures 1, 2:
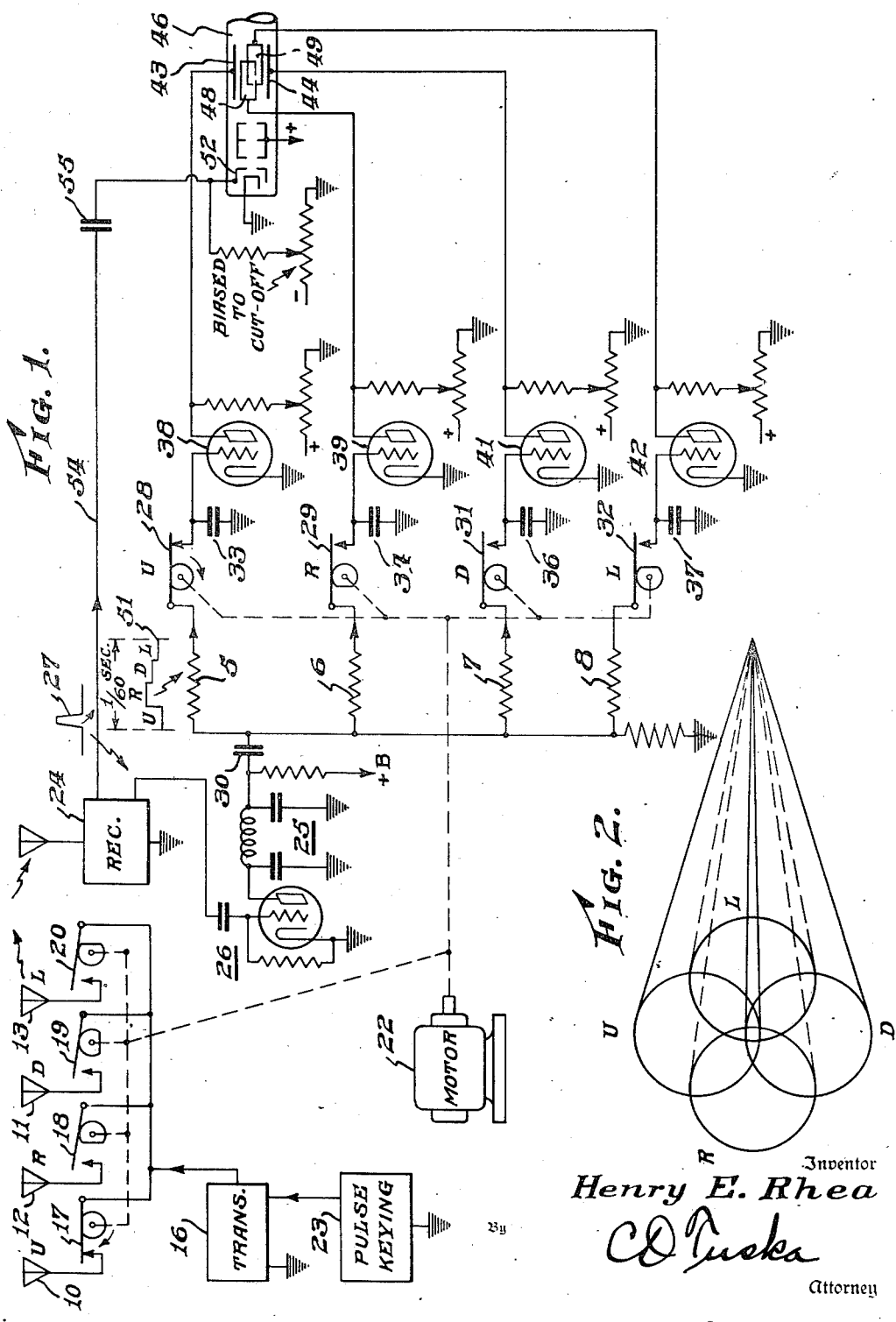

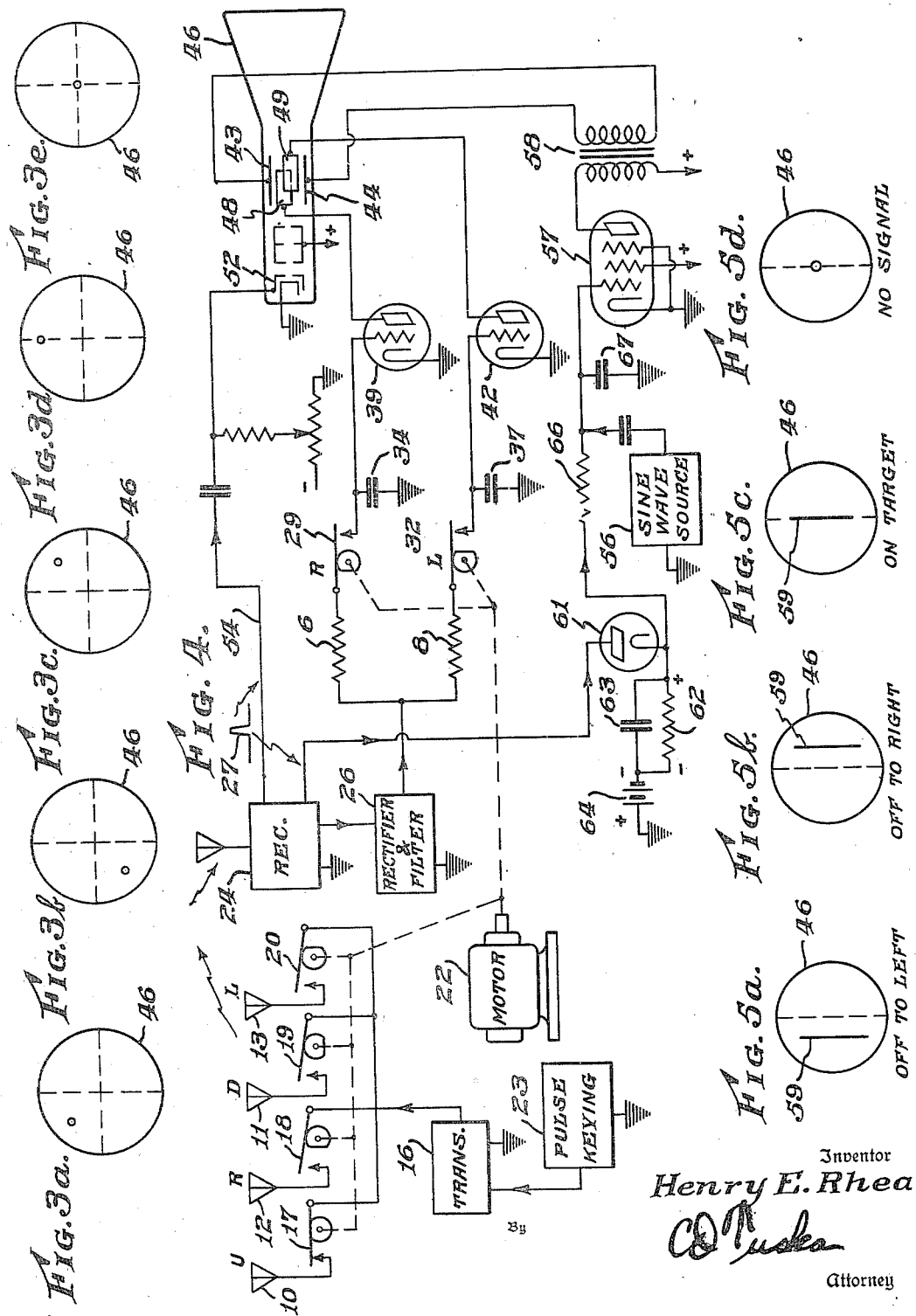

Patented Feb. 11, 1947

2,415,566

UNITED STATES PATENT OFFICE 2,415,566

CATHODE-RAY INDICATOR

Henry E. Rhea, Collingswood, N. J., assignor to Radio Corporation of America, a corporation of Delaware Application February 21, 1942, Serial No. 431,798

11 Claims. (Cl. 250—11)

My invention relates to cathode ray indicator systems and particularly to systems for indicating the position of an object with respect to a radio transmitter.

The invention will be described specifically as applied to a pulse-echo system wherein the transmitter radiates signals from antennas having overlapping directional radiation patterns, the indicator functioning to give the position of the said object with respect to the radiation patterns, and particularly to inform an operator when the object is located at the middle of the overlapping patterns.

An object of the invention is to provide an improved indicator for direction finding or object locating apparatus.

A further object of the invention is to provide an improved cathode ray indicator system for indicating the position of an object with respect to overlapping radiation patterns.

A still further object of the invention is to provide an improved indicator for radio pulse-echo apparatus.

A still further object of the invention is to provide an improved indicator for pulse-echo gun control apparatus or the like wherein a cathode ray spot on the indicator is centered on crosshairs when the gun is on the target.

In a preferred embodiment of the invention it is applied to a pulse-echo system having a directive antenna system so designed that its radiation pattern or patterns may be rotated in both a horizontal plane and a vertical plane to search for an object such as an enemy airplane. The antenna system may consist of four directive antennas which may be keyed successively, as described, for example, in application Serial No. 259,057, filed February 28, 1939, in the name of Irving Wolff, and entitled Object detection and location, or an antenna system may be employed which is keyed by means of shorting condensers as described and claimed in application Serial No. 412,943, filed September 30, 1941, in the name of George H. Brown and entitled Antenna systems. In the receiver, the horizontal and vertical deflecting plates of a cathode ray tube have applied to them D.-C. deflecting voltages which are derived from the received pulses that have been reflected from the target or other object. The deflecting voltage that is applied to each deflecting plate may be obtained from a peak voltage measuring circuit that is switched in synchronism with the keying of the directive antennas. Thus, the horizontal deflection of the cathode ray is determined by the relative amplitudes of the reflected pulses in the two horizontal radiation patterns and its vertical deflection is similarly determined by the reflected pulses in the two vertical radiation patterns.

The invention will be better understood from the following description taken in connection with the accompanying drawings in which Fig. 1 is a circuit and block diagram of one of the preferred embodiments of my invention, Fig. 2 is a diagram of the radiation patterns of the directive antennas employed in the system of Fig. 1, Figs. 3a to 3e are views of the screen end of the cathode ray tube employed in the system of Fig. 1 showing the position of the cathode ray spot for different relative positions of the transmitter radiation patterns and the object or target, Fig. 4 is a circuit and block diagram of another embodiment of my invention, and Figs. 5a to 5d are views of the screen end of the cathode ray tube employed in the system of Fig. 4 showing the cathode ray trace for different positions of a target or the like with respect to the two radiation patterns in the horizontal plane.

In Fig. 1, my indicator is applied to a radio pulse-echo system comprising four directive antennas 10, 11, 12 and 13 for radiating up, down, right and left patterns, respectively, as indicated by the letters U, D, R and L. The radiation patterns for these antennas are overlapping conical patterns of the character indicated in Fig. 2 where the patterns marked U, R, D and L correspond to the antennas similarly marked in Fig. 1. The antennas 10, 11, 12 and 13 may be like those illustrated in the above-mentioned Wolff application, or of any other suitable type, and in the particular system being described are so mounted that they may be moved to make their radiation patterns scan both horizontally and vertically.

High frequency radio pulses are supplied successively to the U, R, D and L antennas from a transmitter 16 through cam operated switches 17, 18, 19 and 20, respectively, driven by a motor 22. The said pulses are obtained by modulating the high frequency carrier wave produced at transmitter 16 by means of keying pulses from a source 23. The source 23 may be a multivibrator supplying pulses recurring at the rate of 4.1 kilocycles per second, for example.

The receiver 24 demodulates the reflected pulses of high frequency energy, 4.1 kc. in the example assumed, to supply pulses 21 to a detector or rectifier 26 which preferably is of the peak rectifying type. In the circuit illustrated the rectifier 26 is a grid-leak biased peak rectifier tube which is well known in the television art. The output of rectifier 26 is passed through a low pass filter 25 and supplied through a large capacity blocking condenser 30 and resistors 5, 6, 7 and 8 and through cam operated switches 28, 29, 31 and 32 to condensers 33, 34, 36 and 37, respectively. The output from the filter 25 is represented by the graph 51 where the four groups of filtered or integrated pulses of unequal amplitude are indicated at U, R, D, L.

The resistors 5, 6, 7 and 8 are provided to make the time constant of the condenser circuits long enough to smooth out and substantially eliminate the effect of any high frequency noise pulses that may be received. Amplifier tubes 38, 39, 41 and 42 have their input electrodes connected across condensers 33, 34, 36 and 37, respectively, whereby the voltage at the anode of each tube changes with any change in the charge on the condenser in the grid circuit. The anodes of tubes 38 and 41 are connected to the vertical deflecting plates 43 and 44, respectively, of a cathode ray indicator tube 46. The anodes of tubes 39 and 42 are connected to the horizontal deflecting plates 48 and 49, respectively.

The cam switches 28, 29, 31 and 32 are driven in synchronism with the antenna switches by the motor 22. Thus, in the diagram the "up" antenna switch 17 is closed, the corresponding "up" switch 28 of the indicator is also closed, and all other switches are open. Next, as the cams are rotated, the switches 18 and 29 close, switches 17 and 28 open, and the other switches remain open. The switching sequence in this particular example is U, R, D, L as will be apparent from the shape of the cams and from the direction of rotation indicated by the arrows. The complete switching cycle may occupy 1/60 second, for example.

The particular graph shown at 51 represents a condition where the radiation pattern of the antenna system is not centered on the target. It will be noted that the reflected pulses during the interval U are of less amplitude than during the interval D, and that during the interval R they are of greater amplitude than during the interval L. During the time switch 28 is closed, the condenser 33 is charged to a voltage equal to the peak voltage of the U group of reflected pulses; after switch 28 opens, condenser 33 retains this charge. When switch 28 next closes, the condenser 33 either acquires more charge or loses some charge if the peak amplitude of the pulses has changed. Similarly, the other condensers 34, 36 and 37 are charged by the received pulses so that the voltages thereacross correspond to the peak amplitudes of the pulses in groups R, D and L, respectively. The switches 28, 29, 31 and 32 preferably are timed to close shortly after the beginning of intervals U, R, D and L of graph 51, respectively, and to open shortly before the end thereof. This prevents any error that might otherwise result from an unlike number of 4.1 kc. pulses in the U, R, D and L groups.

In an indicator of the character being described, it is important to avoid any possibility of a false reading resulting from lack of incoming signal. The circuit of Fig. 1 is so designed that there is no cathode ray spot on the fluorescent screen (not shown) of the tube 46 if there is no incoming signal. This is accomplished by applying to the control grid 52 of the cathode ray tube a negative bias sufficient to bias the tube to beam cut-off, and by applying the received reflected pulses, indicated at 27, to the grid 52 through a conductor 54 and a blocking condenser 55. It may be noted that the time scales for graphs 51 and 27 differ greatly, the pulse 27 actually being very short compared with the interval U, for instance. The amplitude of the pulses 27 at the grid 52 are sufficient to unblock the cathode ray tube to produce a spot on the fluorescent screen as illustrated in Figs. 3a to 3e.

From the foregoing it will be understood that in Figs. 3a to 3e the different positions of the cathode ray spot shown with respect to the crosshairs (represented by the broken lines) give the following information: Fig. 3a indicates that the object or target is above and to the left of the center of the transmitter radiation pattern, also that it is above and to the left of the point at which the gun is aimed where the radiation patterns are being oriented with the gun and the system is being employed for gun control; Fig. 3b indicates the target is below and to the left of the point aimed at; Fig. 3c indicates the target is above and to the right; Fig. 3d indicates it is above but on center horizontally; and Fig. 3e indicates it is on center; that is, the gun is now on the target. If the incoming signal disappears for any reason, the cathode ray spot also disappears.

One important feature of my indicator system is that the transmitter radiation pattern can always be centered on a target regardless of variations in the incoming signal strength since such variations will produce the same percentage change in all the voltages on the deflecting plates. If it is desired to calibrate the cathode ray screen, however, an automatic gain control circuit is provided to keep the receiver output constant.

It may be noted that while the use of a peak rectifier such as rectifier 26 is preferred, it is possible to employ other rectifiers such as one having an output that is a measure of the area or power of a pulse.

In Fig. 4 there is shown an embodiment of the invention that gives left-right indications only, as shown in Figs. 5a to 5d. The left-right deflections of the cathode ray are obtained as previously described. In order to obtain an indication that can be clearly seen and which shows that there is an incoming signal, a vertical deflecting voltage, such as a sine wave voltage, is supplied from a source 56 and through an amplifier tube 57 and a transformer 58 to the vertical deflecting plates 43 and 44. Thus the indicator mark on the tube screen is a vertical line 59 (Figs. 5a to 5c) that is on the vertical cross hair when the transmitter radio beam is on the target in the horizontal plane. A second indicator of similar design may be provided to indicate when the beam is on the target in the vertical plane.

Instead of biasing the cathode ray to beam cutoff, an automatic gain control circuit may be employed to reduce the gain of amplifier 57 substantially to zero when there is no incoming signal. This circuit may comprise a diode 61 and a resistor-capacitor network 62—63 and voltage source 64 across which the pulses 27 are applied. The RC network 62—63 is given a time constant such that the voltage thereacross depends upon the amplitude of the incoming pulses 27. The voltage at the cathode of diode 61 is applied to the control grid of an amplifier 57 through a smoothing filter comprising a series resistor 66 and a shunt condenser 67. If the signal fades away or if the radio beam is not on a target, the negative voltage of source 64 is the bias voltage on the grid of tube 57 and the tube does not pass much, if any, of the sine wave from source 56. In this case there is simply a spot, rather than a line, on the tube screen as shown in Fig. 5d. When there is an incoming signal of the required predetermined amplitude, the voltage across network 62—63 makes the grid voltage on tube 57 less negative whereby the sine wave voltage is applied to the vertical deflecting plates 43—44 to produce the vertical line 59 on the screen.

While in Figs. 1 and 4 the use of the rectifier 26 and filter 25 is desirable, it should be understood that they may be omitted and the pulses 27 applied directly to the switch-condenser units 28—33, 29—34, etc., providing the pulses are of sufficient amplitude to drive the grids of tubes 38, 39, 41 and 42 positive to cause grid rectification.

From the foregoing it will be apparent that I have provided a simple and reliable cathode ray tube indicator for a pulse-echo system or other radio directive system that gives position indications that are easily read and interpreted by an operator and which does not give a reading that might be erroneously interpreted when there is no incoming signal.

I claim as my invention:

1. In a receiver for a system wherein radio pulses are transmitted from directive antennas having overlapping radiation patterns, the said radiation patterns including groups of pulses being radiated in succession toward a reflecting object for reflection therefrom, a pair of amplifier tubes, a cathode ray tube indicator having a pair of deflecting elements, peak rectifier means, means for connecting said rectifier means successively to said amplifier tubes and in synchronism with the radiation of said groups of pulses, respectively, whereby two D.-C. output voltages are obtained from said amplifier tubes which voltages are a measure of the amplitude of said two groups of reflected pulses, and means for applying said D.-C. voltages to said two deflecting elements, respectively.

2. In a receiver for a system wherein radio pulses in overlapping patterns are radiated from a transmitter, the said radiation patterns including groups of pulses being radiated in succession toward a reflecting object for reflection therefrom, a cathode ray tube indicator having a pair of deflecting elements, D.-C. transmitting channels connected to said pairs of deflecting elements, respectively, rectifier means, means for connecting said rectifier means successively to said D.-C. channels and in synchronisms with the radiation of said groups of pulses, respectively, whereby two D.-C. voltages are applied to said two deflecting elements, respectively, which voltages are a measure of the amplitude of said two groups of reflected pulses.

3. In a radio pulse-echo system wherein radio pulses are transmitted to and reflected from a reflecting object, a plurality of directive antennas having overlapping radiation patterns in a certain plane, a radio pulse transmitter unit and a radio pulse receiver unit, means for switching said antennas successively to at least one of said units, a cathode ray tube indicator having a pair of deflecting elements, means for obtaining two D.-C. voltages which are a measure of the amplitude of the groups of reflected pulses in said radiation patterns, respectively, and switching means for applying said two D.-C. voltages to said deflecting elements successively and in synchronism with said antenna switching.

4. The invention according to claim 3 wherein the cathode ray tube is biased to beam cutoff in the absence of incoming signal and wherein means is provided to drive said tube beyond beam cutoff in response to the reception of reflected pulses that exceed a predetermined amplitude.

5. In a radio pulse-echo system wherein radio pulses are transmitted to and reflected from a reflecting object, a plurality of directive antennas having overlapping radiation patterns in the horizontal plane and having overlapping radiation patterns in the vertical plane, each pattern including a group of pulses, a radio pulse transmitter unit and a radio pulse receiver unit, means for switching said antennas successively to at least one of said units, a cathode ray tube indicator having a pair of horizontal deflecting elements and a pair of vertical deflecting elements, means for obtaining two D.-C. voltages which are a measure of the amplitude of the two groups of reflected pulses in the horizontal plane, and for obtaining two D.-C. voltages which are a measure of the amplitude of the two groups of reflected pulses in the vertical plane, means for applying said two first-mentioned D.-C. voltages to the two horizontal deflecting elements, respectively, and means for applying said two last-mentioned D.-C. voltages to the two vertical deflecting elements, respectively.

6. In a radio pulse-echo system wherein radio pulses are transmitted to and reflected from a reflecting object, a plurality of directive antennas having overlapping radiation patterns in the horizontal plane and having overlapping radiation patterns in the vertical plane, each pattern including a group of pulses, a radio pulse transmitter unit and a radio pulse receiver unit, means for switching said antennas successively to at least one of said units, a cathode ray tube indicator having a pair of horizontal deflecting elements and a pair of vertical deflecting elements, means for obtaining two D.-C. voltages which are a measure of the amplitude of the two groups of reflected pulses in the horizontal plane, and for obtaining two D.-C. voltages which are a measure of the amplitude of the two groups of reflected pulses in the vertical plane, and switching means operated in synchronism with said antenna switching for applying said two first-mentioned D.-C. voltages to the two horizontal deflecting elements, respectively, and for applying said two last-mentioned D.-C. voltages to the two vertical deflecting elements, respectively.

7. The invention according to claim 6 wherein the cathode ray tube is biased to beam cutoff in the absence of incoming signal and wherein means is provided to drive said tube beyond beam cutoff in response to the reception of reflected pulses that exceed a predetermined amplitude.

8. In a radio pulse-echo system wherein radio pulses are transmitted to a reflecting object for reflection therefrom, a plurality of directive antennas having overlapping radiation patterns each pattern including a group of pulses, means for receiving said groups of pulses successively after reflection and for demodulating the received pulses, a pair of vacuum tubes each having their input electrodes connected across a condenser, a cathode ray tube indicator having a pair of deflecting elements, means for connecting said demodulating means successively to the input electrodes of said vacuum tubes and in synchronism with the radiation of said patterns, respectively, to obtain two D.-C. output voltages from said vacuum tubes which voltages are a measure of the amplitude of said two groups of reflected pulses, and means for applying said D.-C.

voltages to said two deflecting elements, respectively.

9. In a radio pulse-echo system wherein radio pulses are transmitted to and reflected from a reflecting object, a plurality of directive antennas having overlapping radiation patterns in the horizontal plane and having overlapping radiation patterns in the vertical plane, each pattern including a group of pulses, a radio pulse transmitter unit and a radio pulse receiver unit, means for switching said antennas successively to at least one of said units, a cathode ray tube indicator having a pair of horizontal deflecting elements and a pair of vertical deflecting elements, means for obtaining two D.-C. voltages which are a measure of the amplitude of the two groups of reflected pulses in one of said planes, means for applying said two D.-C. voltages to the deflecting elements of one pair, respectively, and means for applying a sine wave voltage to the other pair of deflecting elements.

10. The invention according to claim 9 wherein means is provided to reduce the amplitude of said sine wave in response to a reduction in the amplitude of the received pulses.

11. In combination, means for transmitting radio signals and means for receiving them after reflection from an echo source, at least one of said means including an assembly of directive antennas having overlapping radiation patterns, switching means for making said patterns effective successively to supply signal to a receiving circuit, said radiation patterns having characteristics such that the received signal differs in strength for the successive radiation patterns in accordance with the displacement of said radiation patterns with respect to the sources of the echoes, a plurality of capacitors included in said receiving circuit, receives switching means synchronized with the antenna assembly switching means, means comprising said synchronized switching means and said receiving means for charging each of said capacitors in accordance with the received signal during the intervals that each of said radiation patterns, respectively, is effective to supply signal to the receiving means, a cathode ray tube indicator having a pair of deflecting elements, and means for applying to each of said deflecting elements a direct-current voltage which is proportional to the voltage across said capacitors, respectively.

HENRY E. RHEA.

REFERENCES CITED

The following references are of record in the file of this patent:

UNITED STATES PATENTS

| Number | Name | Date |
|---|---|---|
| 2,189,549 | Hershberger | Feb. 6, 1940 |
| 2,231,929 | Lyman | Feb. 18, 1941 |
| 2,130,913 | Tolson | Sept. 20, 1938 |